(12) United States Patent
Yamakawa

(10) Patent No.: US 9,524,125 B2
(45) Date of Patent: Dec. 20, 2016

(54) PRINTING SYSTEM, IMAGE PROCESSING APPARATUS, INFORMATION PROCESSING METHOD AND STORAGE MEDIUM

(71) Applicant: CANON KABUSHIKI KAISHA, Tokyo (JP)

(72) Inventor: Junichi Yamakawa, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/750,213

(22) Filed: Jun. 25, 2015

(65) Prior Publication Data

US 2016/0004483 A1    Jan. 7, 2016

(30) Foreign Application Priority Data

Jul. 7, 2014    (JP) ................................. 2014-139883

(51) Int. Cl.
    *G06F 3/12*    (2006.01)
(52) U.S. Cl.
    CPC ........... *G06F 3/1204* (2013.01); *G06F 3/1222* (2013.01); *G06F 3/1238* (2013.01); *G06F 3/1285* (2013.01)
(58) Field of Classification Search
    CPC .... G06F 3/1204; G06F 3/1222; G06F 3/1238; G06F 3/1285
    USPC ............................................... 358/1.14, 1.15
    See application file for complete search history.

(56) References Cited

U.S. PATENT DOCUMENTS

| | | | |
|---|---|---|---|
| 6,977,747 B1 | 12/2005 | Matsukubo | |
| 7,551,319 B2 | 6/2009 | Ogasawara | |
| 8,014,008 B2 | 9/2011 | Yamakawa | |
| 8,456,682 B2 | 6/2013 | Yamakawa | |
| 8,873,092 B2* | 10/2014 | Ohhashi | G06F 3/122 358/1.14 |
| 2007/0081186 A1* | 4/2007 | Numata | H04N 1/00352 358/1.15 |
| 2013/0242334 A1* | 9/2013 | Ichida | G06F 3/1222 358/1.14 |

(Continued)

FOREIGN PATENT DOCUMENTS

| | | |
|---|---|---|
| JP | 9-305331 | 11/1997 |
| JP | 2006-18654 | 1/2006 |

OTHER PUBLICATIONS

U.S. Appl. No. 14/751,932, filed Jun. 26, 2015.

*Primary Examiner* — Allen H Nguyen
(74) *Attorney, Agent, or Firm* — Fitzpatrick, Cella, Harper & Scinto

(57) ABSTRACT

To promptly perform printing even if authentication information for printing by a printing apparatus is not set to a print job, a printing system which includes an image processing apparatus and the printing apparatus is provided. In the printing system, the image processing apparatus comprises; a setting unit configured to set authentication information of the image processing apparatus to the print job stored in the image processing apparatus, as authentication information of the printing apparatus; and a transmitting unit configured to transmit the print job to which the authentication information has been set, to the printing apparatus: and the printing apparatus comprises; an authenticating unit configured to perform authentication based on the authentication information set to the print job; and a performing unit configured to perform printing of the print job in a case where the authentication by the authenticating unit is successful.

12 Claims, 12 Drawing Sheets

(56) References Cited

U.S. PATENT DOCUMENTS

| | | | | |
|---|---|---|---|---|
| 2014/0211238 A1* | 7/2014 | Nakajima | ............. | G06F 3/1238 |
| | | | | 358/1.14 |
| 2014/0313539 A1* | 10/2014 | Kawano | ................. | G06F 21/44 |
| | | | | 358/1.14 |
| 2015/0009527 A1* | 1/2015 | Mochizuki | ......... | G06K 15/1806 |
| | | | | 358/1.15 |

* cited by examiner

FIG. 5

| | JOB MANAGER | | | | | | | _ □ × |
|---|---|---|---|---|---|---|---|---|
| FILE EDIT VIEW TOOL HELP | | | | | | | | |

PROPERTY | STANDBY | STOP | RIP PROCESS | DELETION | PREVIEW | PRINT

504 — VEGA087   Weekly Review (15)   IN PRINTING (12/20) — 503
                                                              502

| STANDBY | PRINTED | PRINTER | SUPPORT |
|---|---|---|---|

505    506    507    508    509    510    511

| | JOB NAME | STATUS | USER | PAGES | NUMBER OF COPIES | SIZE | DATE AND HOUR |
|---|---|---|---|---|---|---|---|
| ☐ | File | STANDBY | User1123 | 200 | 20 | A4 | 04/21/2014 08:40:23 |
| ☐ | Report2010 | STANDBY | Operator | 120 | 30 | A3 | 04/21/2014 14:30:22 |
| ☐ | Photo Book | PROCESSED | User0245 | 30 | 15 | A3 | 04/22/2014 10:20:53 |
| ☐ | Booklet-1 | PROCESSED | Operator | 20 | 350 | A3 | 04/23/2014 21:19:55 |
| ■ | File-2 | STANDBY | User4512 | 15 | 100 | A4 | 04/24/2014 09:46:13 |
| ☐ | Pamphlet 1 | PROCESSED | User3423 | 1 | 500 | A4 | 04/24/2014 09:59:33 |
| ☐ | Pamphlet 2 | STANDBY | User4512 | 2 | 20 | A3 | 04/24/2014 11:26:00 |
| ☐ | File-3 | STANDBY | User1123 | 110 | 400 | A4 | 04/25/2014 17:20:23 |
| ☐ | Report | STANDBY | User5153 | 240 | 35 | A3 | 04/25/2014 23:41:23 |

501

PRINTING SYSTEM, IMAGE PROCESSING APPARATUS, INFORMATION PROCESSING METHOD AND STORAGE MEDIUM

BACKGROUND OF THE INVENTION

1. Field of the Invention

The present invention relates to a printing system, an image processing apparatus and an information processing method which enable to promptly perform printing even in a case where authentication information for printing by a printing apparatus has not been set to a print job, and a program for achieving the information processing method.

2. Description of the Related Art

There is a printing apparatus system which has functions of performing various processes to a print job. As one of the functions, there is the function of storing a print job for which a series of processes has been completed in the printing apparatus system mainly for the purpose of subsequent reprinting (Japanese Patent Application Laid-Open No. H09-305331). In the print job, various print settings related to printing, e.g., a user information setting, a print paper setting, an image process setting, a finishing setting and the like have been designated as print attribute information. The printing apparatus system performs a printing process based on the print attribute information like this, and, after completing the overall printing process, stores the print job together with the print attribute information in the printing apparatus system. Besides, there is a workflow of storing print jobs in the printing apparatus system without performing printing of these print jobs and then performing, by an operator, printing of the stored print jobs in a lump.

Besides, there is a printing apparatus system which has a function of performing authentication to a print job and performing a process according to the result of the authentication (Japanese Patent Application Laid-Open No. 2006-018654). In the printing apparatus system like this, in a printing process of the print job, for example, the user authentication is performed using user information set to the print job. In the printing apparatus system, the printing process is continued and performed only when the set user information coincides with user information previously set in the printing apparatus system, whereas the printing process is stopped when the set user information does not coincide with the user information previously set in the printing apparatus system.

However, in a case where the printing apparatus system is constituted by an image processing apparatus and a printing apparatus and user authentication is necessary for printing in the printing apparatus, there is a problem that, when PDL (page description language) data or the like of the print job stored in the image processing apparatus is printed by the printing apparatus, the printing cannot actually be performed if the authentication information for the printing by the printing apparatus has not been set to the PDL data. This is because the authentication information for the printing by the printing apparatus is unnecessary when the print job is stored in the image processing apparatus. Accordingly, when the operator performs the printing of the print jobs stored in the image processing apparatus in a lump, he/she has to confirm the authentication information for the printing apparatus in each print job. Then, when there is no authentication information, the operator has to input the authentication information every time and then perform the printing, thereby taking much time.

SUMMARY OF THE INVENTION

Therefore, the present invention is directed to a printing system which includes an image processing apparatus and a printing apparatus, wherein: the image processing apparatus comprises, a setting unit configured to set authentication information of the image processing apparatus to a print job stored in the image processing apparatus, as authentication information of the printing apparatus, and a transmitting unit configured to transmit the print job to which the authentication information has been set, to the printing apparatus; and the printing apparatus comprises, an authenticating unit configured to perform authentication based on the authentication information set to the print job, and a performing unit configured to perform printing of the print job in a case where the authentication by the authenticating unit is successful.

Further features of the present invention will become apparent from the following description of exemplary embodiments with reference to the attached drawings.

BRIEF DESCRIPTION OF THE DRAWINGS

FIG. 5 is a diagram for describing a job manager.

DESCRIPTION OF THE EMBODIMENTS

Hereinafter, preferred embodiments of the present invention will be described with reference to the attached drawings.

FIRST EMBODIMENT

<System Configuration>

Figure 1:
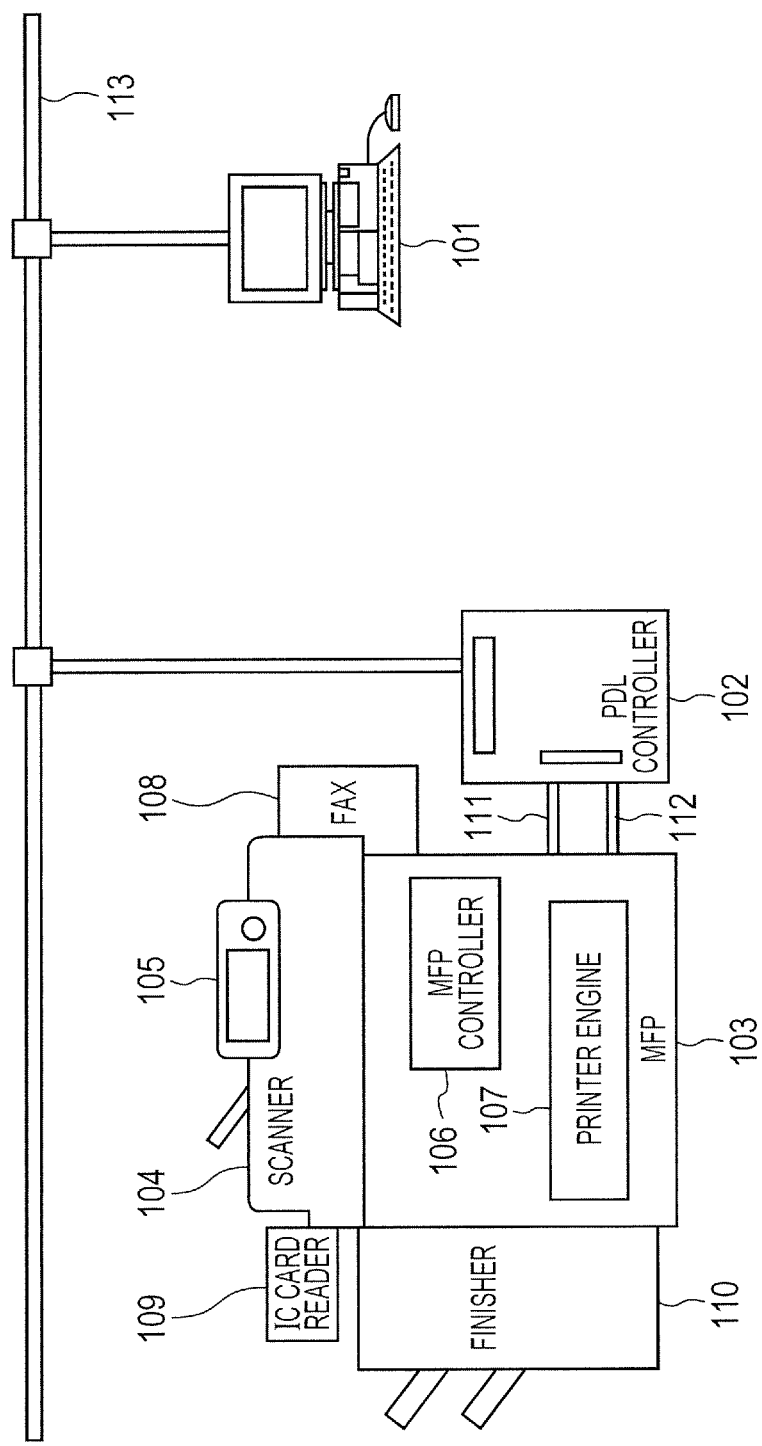
FIG. 1 is a diagram illustrating a configuration of a printing system.

FIG. 1 is a diagram illustrating an example of a configuration of a printing system.

An application or a function of a printer driver of a client computer is realized by a procedure that a CPU (central processing unit) of a client computer 101 performs processes on the basis of programs stored in a memory or the like of the client computer. A user instructs the printing to be performed at an MFP 103 through a screen or the like to be displayed on a display or the like of the client computer 101 by the printer driver. In FIG. 1, although one client computer is included in a printing system, plural client computers may be included. A PDL controller 102 generates image data from PDL data created by the printer driver of the client computer 101. The MFP 103 is used as a printer for printing the image data generated by the PDL controller 102 and also used as a copying machine. A scanner 104 is equipped with an automatic document feeder. The PDL controller 102 is an example of an image processing apparatus.

An operation unit 105 is constituted by a touch-panel display part and hardware buttons such as a copy start button and the like. An MFP controller 106 controls the MFP 103. A printer engine 107 performs the printing on the basis of a control of the MFP controller 106. A FAX 108 is connected to a telephone line. An IC card reader 109 performs a communication with an IC card and reads information or the like from the IC card. A finisher 110 has functions of stapling and shifting papers.

The PDL controller 102 and the MFP 103 are communicatively connected with each other by a local area network cable 111, through which a control signal for the PDL printing flows, and an image transfer video cable 112. The client computer 101 and the PDL controller 102 are connected with each other through a network 113.

<Hardware Constitutions of MFP and PDL Controller>

Figure 2:
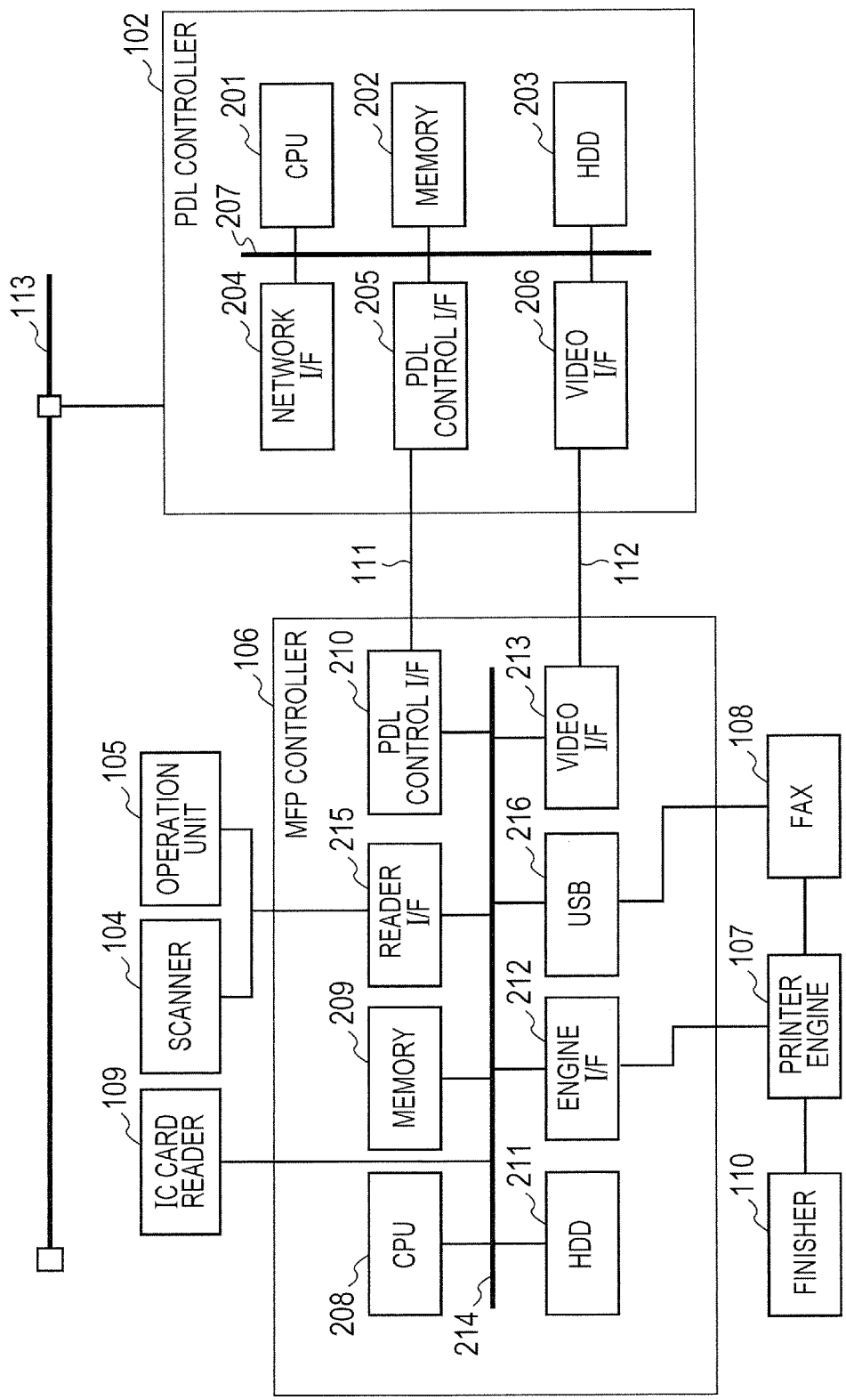
FIG. 2 is a block diagram illustrating hardware constitutions of a PDL controller and an MFP (multifunction peripheral).

FIG. 2 is a block diagram illustrating an example of hardware constitutions of the PDL controller 102 and the MFP 103. The PDL controller 102 has the following constitution. A CPU 201 performs a control of each of units in the PDL controller and calculations and executes programs stored in a storage device through a system bus 207. A memory 202 is used as a temporary storage area and a work memory at the time of decompressing an image of PDL data. An HDD (hard disk drive) 203, which is a large-capacity storage device, stores various control programs to be executed by the CPU 201. In addition, the HDD 203 is used as a temporary storage area of data to be processed or a storing area of print jobs. A network I/F (interface) 204 performs a communication with another apparatus such as a client computer or the like through an external network. Although a PDL control I/F 205 is also a network interface similar to the network I/F 204, the PDL control I/F 205 performs a control of a PDL printing process and performs a transmission/reception of control commands between the PDL control I/F 205 and the MFP 103.

The software configuration of the PDL controller 102 and processes or the like in a flow chart of the PDL controller 102 to be described later are realized by a procedure that the CPU 201 performs the processes on the basis of programs stored in the memory 202 or the HDD 203.

The MFP 103 has the following constitution. A CPU 208 performs a control of each of units of the MFP and calculations and executes programs stored in a storage device through a system bus 214. A memory 209 is used as a temporary storage area and a work memory at the time of operating a printing apparatus. An HDD 211, which is a large-capacity storage device, stores various control programs to be executed by the CPU 208. In addition, the HDD 211 is used as a temporary storage area of data to be processed or a storing area. The IC card reader 109 is connected to the system bus 214.

A PDL control I/F 210 performs a control of a PDL printing process intended to perform the printing by a printer engine and performs a transmission/reception of control commands between the PDL control I/F 210 and the PDL controller 102.

An engine I/F 212 performs communication control to be kept with the printer engine 107. The printer engine 107 and the finisher 110 are connected with each other by a dedicated cable. The scanner 104 and the operation unit 105 are connected with the MFP controller 106 by a reader I/F 215. A USB controller 216 is connected with the FAX 108.

The software configuration of the MFP 103 and processes or the like in a flow chart of the MFP 103 are realized by a procedure that the CPU 208 performs the processes on the basis of programs stored in the memory 209 or the HDD 211.

<Software Module>

Figure 3:
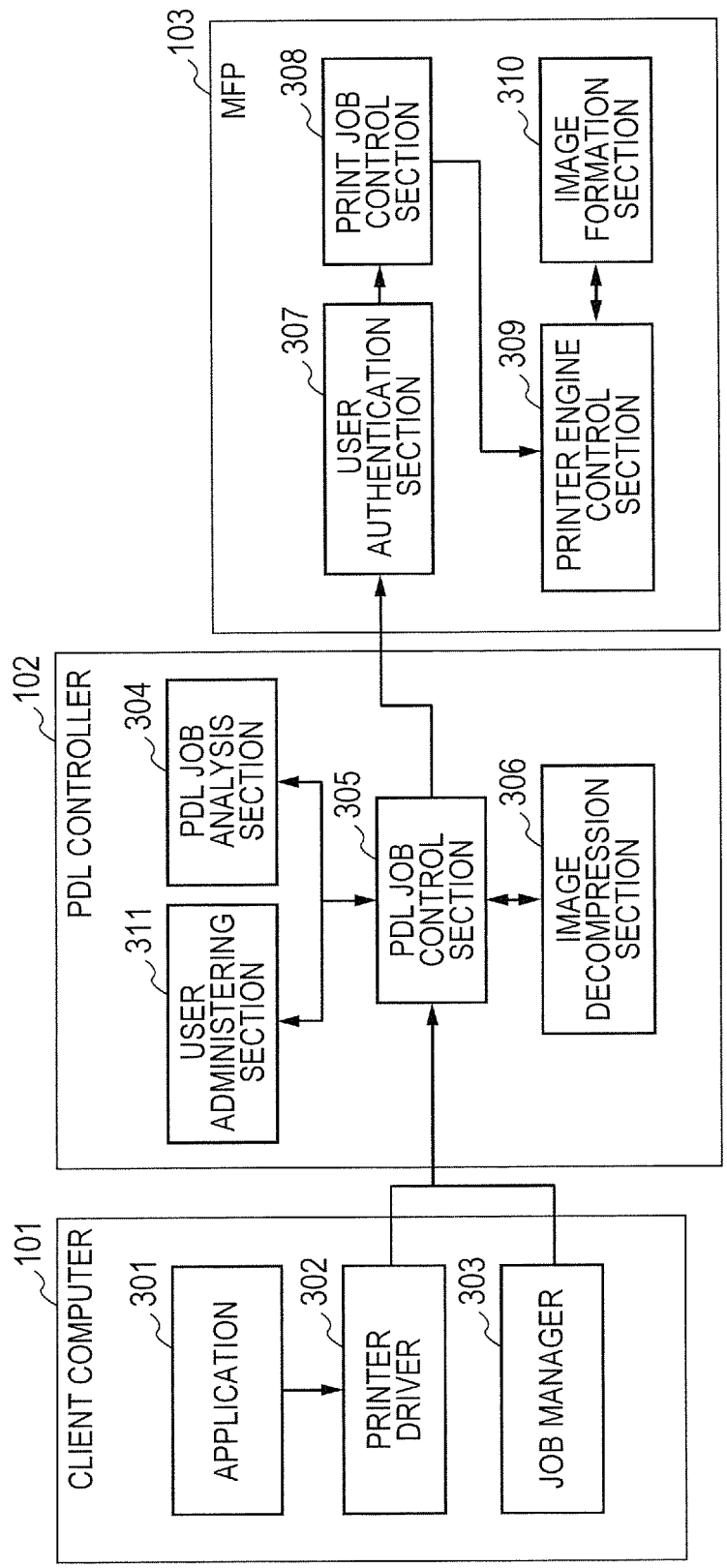
FIG. 3 is a block diagram illustrating software configurations of the printing system.

FIG. 3 is a block diagram illustrating an example of software configurations of a printing apparatus system.

The software configurations of the client computer 101 are realized by a procedure that a CPU of the client computer 101 performs processes on the basis of programs stored in a memory of the client computer 101.

The client computer 101 includes an application 301, a printer driver 302 and a job manager 303 as the software configurations.

The printer driver 302 converts application data created by the application 301 on the client computer 101 into PDL data to which print settings for both-side printing, finishing method and the like were reflected. Then, the printer driver 302 transmits the PDL data to the PDL controller 102 as a print job through the network 113.

The printer driver 302 has to designate a print queue in accordance with the kind of printing process of the PDL controller 102. More specifically, the printer driver 302 designates the print queue from among the following three kinds of queues.

- a print queue for storing a print job in a printed queue of the HDD 203 in the PDL controller 102 after the printing
- a standby queue for storing a print job in the standby queue of the HDD 203 in the PDL controller 102 without printing PDL data
- a direct connection characterized in that the PDL data is not stored in the PDL controller 102 after the printing The job manager 303 is login connected to the PDL controller 102 through the network 113 and performs the administration of a print job stored in the PDL controller 102, the printing or the like.

The PDL controller 102 includes a PDL job analysis section 304, a PDL job control section 305, an image decompression section 306 and a user administering section 311 as the software configurations.

The PDL job control section 305 performs processes concerning a reception of the print job from the client computer 101, an instruction of a job analysis process, an instruction of an image decompressing process, a transmission of image data to the MFP 103 and the like and controls thereof.

The PDL job analysis section 304 performs an analysis of PDL data of the print job and returns the print setting of the print job to the PDL job control section 305.

The image decompression section 306 performs an image decompressing process from the PDL data to image data and performs to generate the image data.

The user administering section 311 performs administration of a login user operating with the job manager 303 and the PDL controller 102.

The MFP 103 includes a user authentication section 307, a print job control section 308, a printer engine control section 309 and an image formation section 310 as the software configurations.

The user authentication section 307 performs a user authenticating process on the basis of database in the MFP controller 106 or user account information stored in an external database such as an LDAP (Lightweight Directory Access Protocol) server or the like.

The print job control section 308 performs a printing instruction to the printer engine control section 309 on the basis of the received image data and print setting information.

The printer engine control section 309 controls the printer engine 107 by giving an instruction to the image formation section 310.

The image formation section 310 controls a process of forming an image on a paper from image data.

<Print Attribute Information Setting Method>

Figure 4:
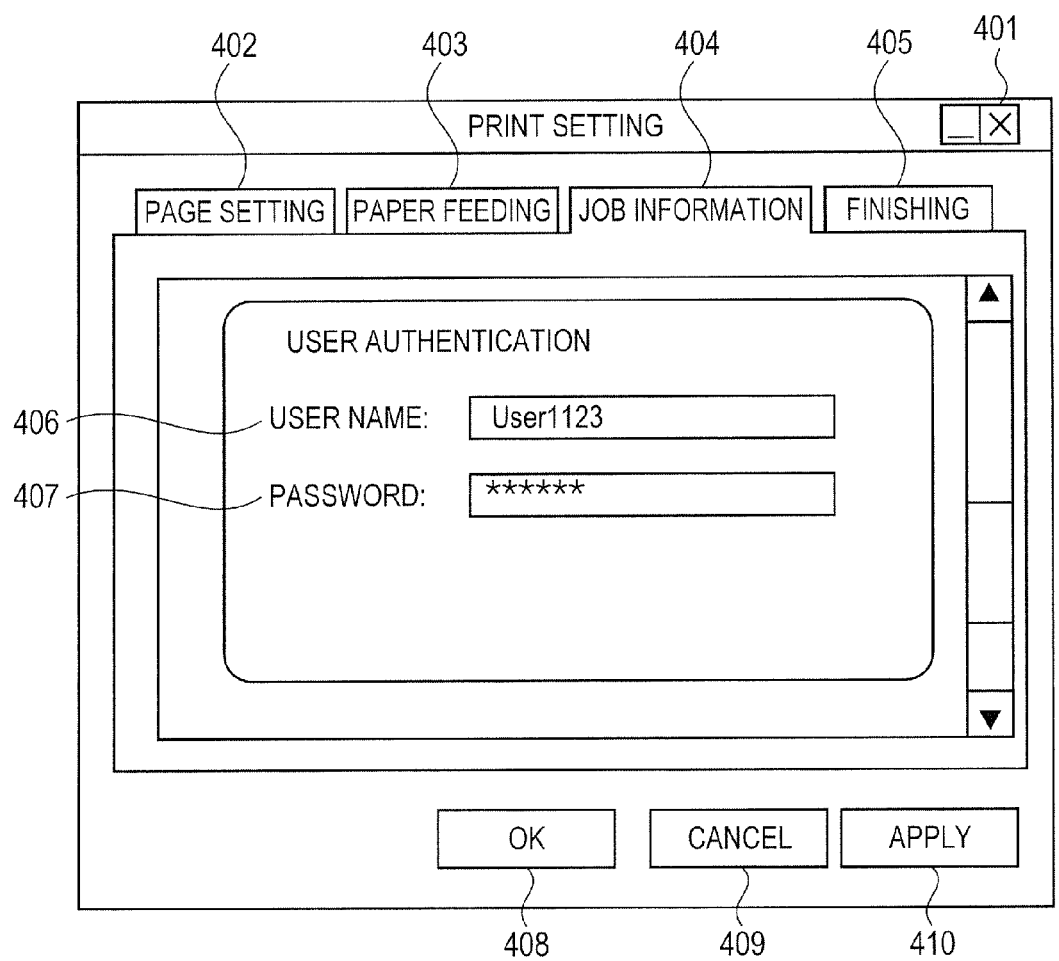
FIG. 4 is a diagram for describing a method of setting print attribute information of a print job.

FIG. 4 is a diagram for describing a method of setting print attribute information of a print job.

A print setting screen 401 has plural setting screens classified into a page setting tab 402, a paper feeding tab 403, a job information tab 404 and a finishing tab 405. The print setting screen 401 is a UI (user interface) which performs various print settings as print attribute information for the print job. When respective areas are selected on a GUI (graphical user interface), it is shifted to the respective setting screens. In FIG. 4, a setting screen of the job information tab 404 is displayed. In addition, an OK button 408, a cancel button 409 and an application button 410 are included in the print setting screen 401. Incidentally, this print setting screen 401 is displayed on a display or the like of the client computer 101 when, for example, the print attribute information of the print job is set by the printer driver 302 of the client computer 101. Further, this print setting screen 401 is displayed when, for example, the print attribute information of the print job, which was stored as a hold job, is changed by accessing the PDL controller 102 by using dedicated utility software, a browser or the like through the network 113.

The page setting tab 402 is a UI which performs the print setting related to the page setting in the print attribute information included in the print job. For example, various designations concerning a printed-document page size, an output paper size, a page layout, enlargement, reduction and the like are performed at the page setting tab 402. The paper feeding tab 403 is a UI which performs the print setting related to the paper feeding in the print attribute information included in the print job. For example, various designations concerning a paper cassette, a paper kind, insertion papers, cover/back cover and the like are performed at the paper feeding tab 403.

The job information tab 404 is a UI which performs the print setting related to job information in the print attribute information included in the print job. For example, although various designations concerning the number of copies, authentication information and the like are performed at the job information tab 404, here, the authentication information will be described in detail. The job information tab 404 has areas of inputting a user name and a password in order to perform the setting of user authentication information. That is, the job information tab 404 is a UI which is used for setting authentication information required for the decision given in the user authentication section 307 in the print attribute information included in the print job. Here, the authentication information required for the decision given in the user authentication section 307 will be described as a user name and a password of a user who performs the print job in the printing system. A user name 406 is a UI which is used for inputting a user name of a user who performs the print job in the printing system in the authentication information required for the decision given in the user authentication section 307. A password 407 is a UI which is used for inputting the password to be paired with the user name of the user who performs the print job in the printing system in the authentication information required for the decision given in the user authentication section 307. Additionally, the authentication information, which was input to the user name 406 and the password 407, is processed at the PDL controller 102 as a part of the print attribute information included in the print job and is used for an authenticating process to be performed by the user authentication section 307 as a part of print job data in the MFP 103. That is, in the user authentication section 307, only a case when the authentication information previously fixed in the MFP 103 coincides with the authentication information which was input to the user name 406 and the password 407 included in the print job data, a printing process of the print job data is continued. Therefore, when the print job is stored in the PDL controller 102 as a hold job, it is allowed that the authentication information which was input to the user name 406 and the password 407 does not coincide with the authentication information which was previously fixed in the MFP 103 or the authentication information is not input.

The finishing tab 405 is a UI which performs the print setting related to the page setting in the print attribute information included in the print job. For example, a user can perform various settings concerning the both-side printing, a binding direction, stapling, punching, folding, a discharge tray and the like at the finishing tab 405.

When the area of the OK button 408 on a GUI is depressed, information which was input at the print setting screen 401 is stored and a screen of the print setting screen 401 is closed.

Next, when the area of the cancel button 409 on the GUI is depressed, the information which was input at the print setting screen 401 is abandoned and a screen of the print setting screen 401 is closed.

At last, when the area of the application button 410 on the GUI is depressed, the information which was input at the print setting screen 401 is stored and a screen of the print setting screen 401 is continuously displayed.

<Job Manager>

FIG. 5 is a diagram for describing the job manager 303. The job manager 303 is one of the dedicated utility of the PDL controller 102. A screen 501 is a window screen of the job manager 303. The job manager 303, which is an application for performing administration of the print job stored in the PDL controller 102, is login connected to the PDL controller 102 from the client computer 101 through a network.

A user who can perform a login operation is such a user who is created as a previously prepared "administrator", "operator" or "guest" by the user administration setting of the PDL controller 102.

Print authority can be set to the user from the job manager 303. The administrator and the operator have the print authority. The guest does not have the print authority. The print authority can be set from the job manager 303 to a user also regarding another created user.

The job manager 303 performs the following instructions to a print job selected at a command toolbar 502. That is, instructions such as an instruction of displaying property (attribute), an instruction of shifting to a standby queue, an instruction of stopping the print job, an instruction of performing a RIP (raster image processor) process (i.e., decompression into image data), an instruction of deleting the print job, an instruction of previewing the print job, an instruction of printing the print job and the like are performed.

The job manager 303 displays a name of the connected PDL controller and a current status on a status display part 503.

In the example of FIG. 5, the status that the name of the PDL controller is VEGA087 and "Weekly Review (15)" is being printed currently at the twelfth copy (among 20 copies) is displayed on the status display part 503.

A list of hold jobs stored in the PDL controller 102 is displayed at a standby queue tab 504. Items to be displayed in the list are as follows. In items of a job name part 505, names of print jobs are displayed. In items of a status part 506, statuses of standby queue of PDL data are displayed. Namely, "STANDBY" in items of the status part 506 indicates that the PDL data is in a standby state, and "PROCESSED" in items of the status part 506 indicates that the PDL data is stored with a state of decompressed image data. In items of a user part 507, owner names of print jobs are indicated. Namely, "User 1123" in items of the user part 507 is a user name of a client computer when the print job is transmitted from the client computer to the standby queue, "Operator" in items of the user part 507 indicates that a login operation has been performed by an operator when the print job was imported to the standby queue by the job manager 303. In items of a page part 508, respective numbers of pages of print jobs are indicated. In items of a number of copies part 509, respective numbers of copies of print jobs are indicated. In items of a size part 510, paper sizes of print jobs are indicated. In items of a date and time part 511, dates and times when print jobs were supplied to the standby queue are indicated.

<Printing of Hold Job>

Figure 6:
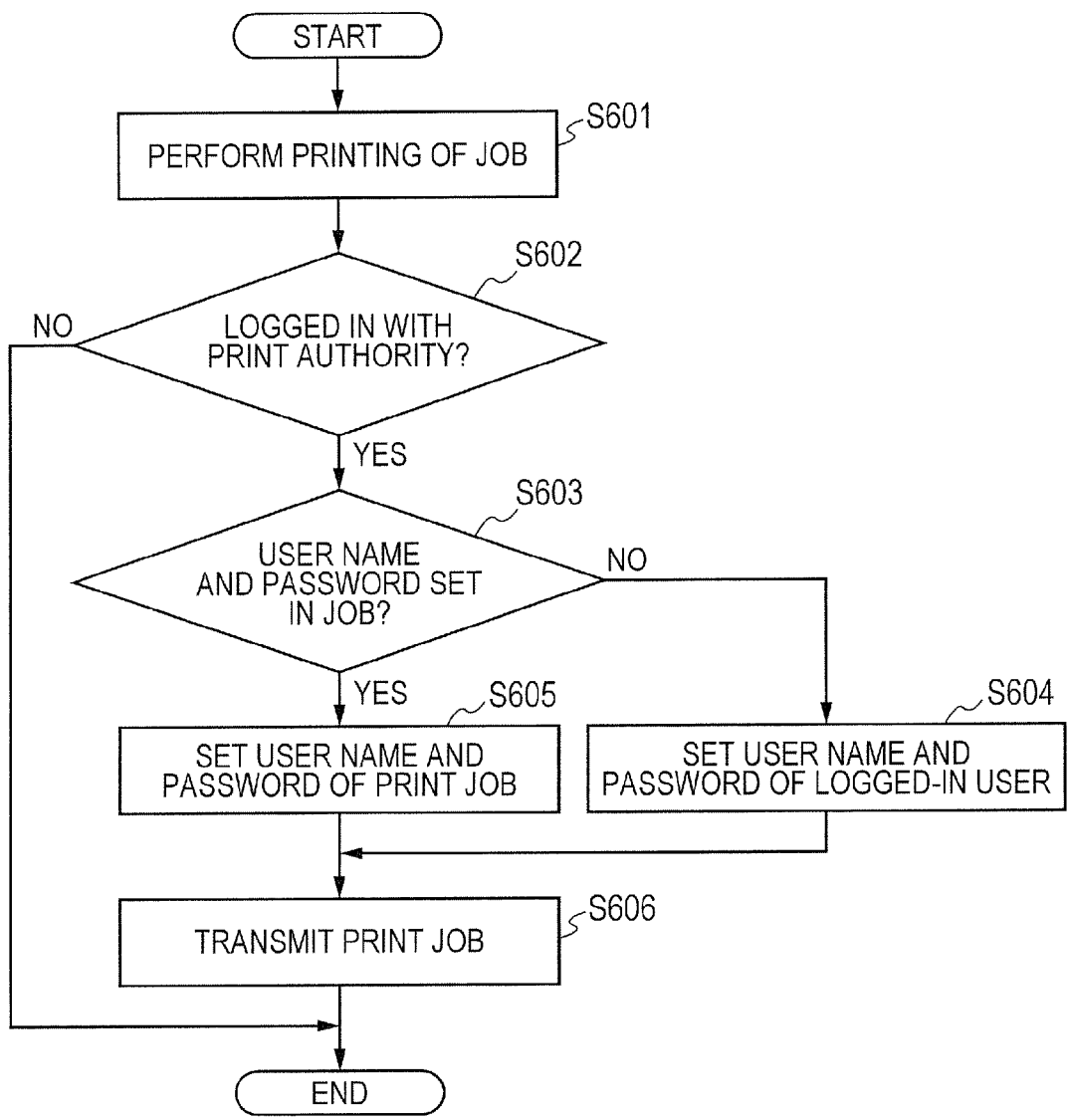
FIG. 6 is a flow chart (part 1) indicating an information process concerning setting of authentication information.

A process when the hold job stored in the standby queue of the PDL controller 102 is printed will be described with reference to a flow chart in FIG. 6. FIG. 6 is a flow chart indicating the information processing related to the setting of authentication information.

When it is detected that a hold job was selected on a standby queue list of the job manager 303 and a print button on the command toolbar 502 was depressed, the PDL job control section 305 starts to print the hold job in S601.

In S602, the user administering section 311 checks whether or not a user who logs in to the job manager 303 has the print authority. When the user does not have the print authority, a process indicated in FIG. 6 is terminated, and when the user has the print authority, the flow advances to S603.

In S603, the PDL job control section 305 checks print attribute information of the hold job and decides whether or not a user name and a password are set to the print job. When the user name and the password are not set to the print job, the PDL job control section 305 advances the process to S604, and when the user name and the password are set to the print job, the PDL job control section 305 advances the process to S605.

In S604, the PDL job control section 305 sets a user name and a password of a logged-in user as print attribute information of image data to be transmitted to the MFP 103.

In S605, the PDL job control section 305 sets the user name and the password, which are set as the print attribute information of the print job, as print attribute information of image data to be transmitted to the MFP 103.

In S606, the PDL job control section 305 transmits a print job which includes image data and print attribute information to the user authentication section 307.

Figure 7:
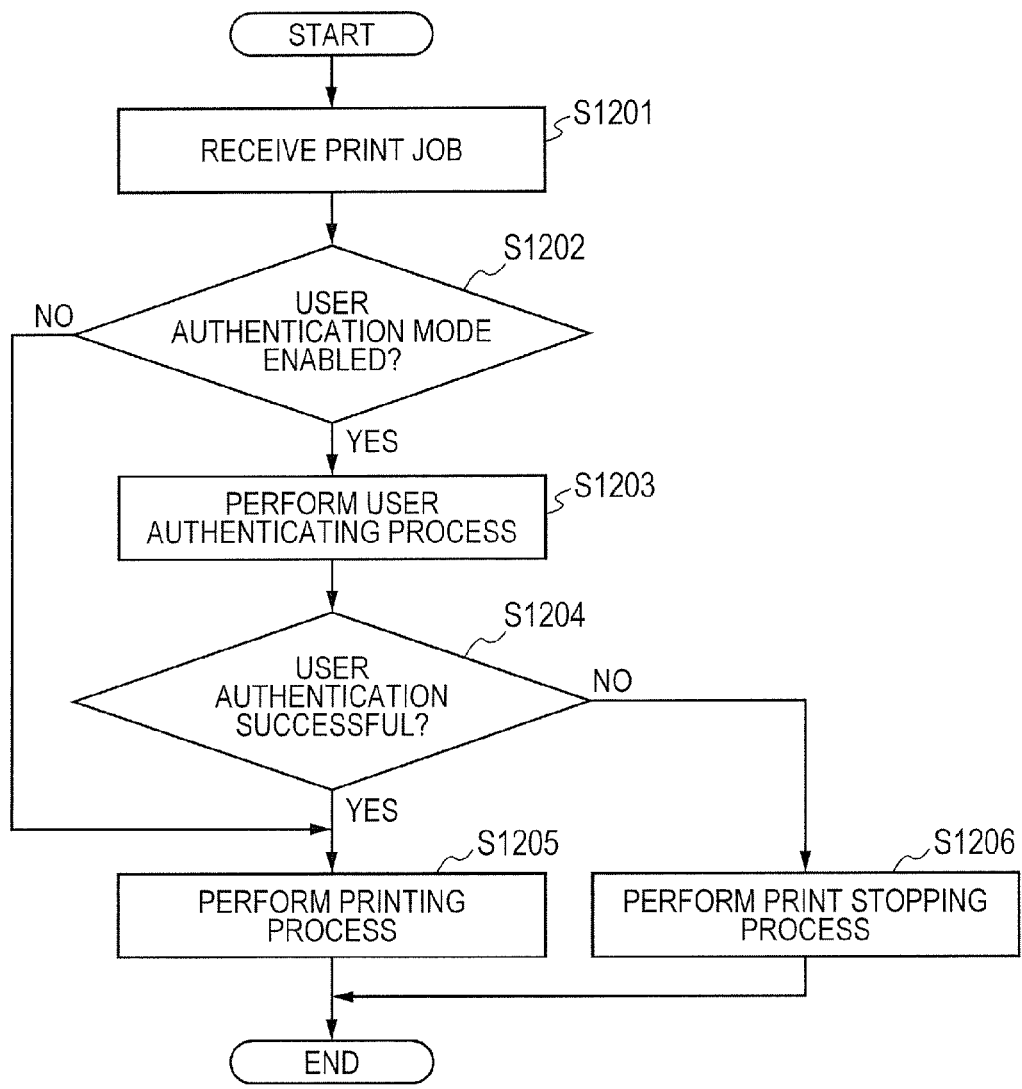
FIG. 7 is a flow chart indicating an information process in case of printing of the print job.

FIG. 7 is a flow chart when the print job transmitted from the PDL controller 102 is printed at the MFP 103.

In S1201, the MFP 103 receives the print job which the PDL controller 102 transmitted.

In S1202, the user authentication section 307 of the MFP 103 confirms whether or not a user authentication mode is enabled. When the user authentication mode is not enabled, the user authentication section 307 advances the process to S1205, and when the user authentication mode is enabled, the user authentication section 307 advances the process to S1203. For example, when the user authentication section 307 operates in the user authentication mode as an operation mode of the MFP 103 or when the user authentication section itself is normally activating, the user authentication section 307 decides that the user authentication mode is enabled.

In S1203, the user authentication section 307 of the MFP 103 compares user information of the received print job with user information stored in the HDD 211 in the MFP 103 on the basis of the user information such as a user name, a password or the like included in print attribute information of the received print job. Then, the user authentication section 307 decides whether or not the two user pieces of information coincide with each other and performs the user authentication. However, a user has to perform the user authentication by inputting user authentication information from the operation unit 105 also in case of utilizing a copy function or a transmission (send) function of the MFP 103.

In S1204, the user authentication section 307 confirms a result of the user authentication and decides whether or not the user authentication resulted in success. When the user authentication resulted in success, the user authentication section 307 advances the process to S1205. On the other hand, when the user authentication did not result in success (that is, when the user information of the print job did not coincide with the user information stored in the HDD 211 of the MFP 103), the user authentication section 307 advances the process to S1206.

In S1205, the print job control section 308 of the MFP 103 transmits a control command of a printing process from the engine I/F 212 to the printer engine 107 in accordance with image data included in print job data and print setting information and performs the printing.

In S1206, the print job control section 308 of the MFP 103 performs a process of stopping to print the print job and displays a fact that the print job cannot be performed on the operation unit 105.

As described above, the PDL controller 102 sets a user name and a password when logging in to the PDL controller 102 from the job manager 303 to the hold job in which the authentication information to the MFP 103 is not included when the printing of the hold job is performed. Then, the PDL controller 102 transmits the hold job, to which the user name and the password were set, to the MFP 103. According to this process, it can be prevented that the hold job becomes unable to be printed due to an authentication error.

SECOND EMBODIMENT

<Setting of User Authentication Information>

In the first embodiment, when the user authentication information of the MFP 103 is not included in the hold job, the PDL controller 102 set the user name and the password, which were used in case of logging in to the PDL controller 102, to the hold job as the user authentication information. However, in this case, there is possibility of causing the following problems.

First, when the user authentication information set to the hold job is wrong, the printing has to be performed after correctly setting the user authentication information. In addition, there is a case where the operator who performs the printing of the hold job is different from the operator who owns the hold job displayed in the user part 507 of the job manager 303. On this occasion, there is a case where consistency cannot be taken in the user output administration of the MFP 103.

Figure 8:
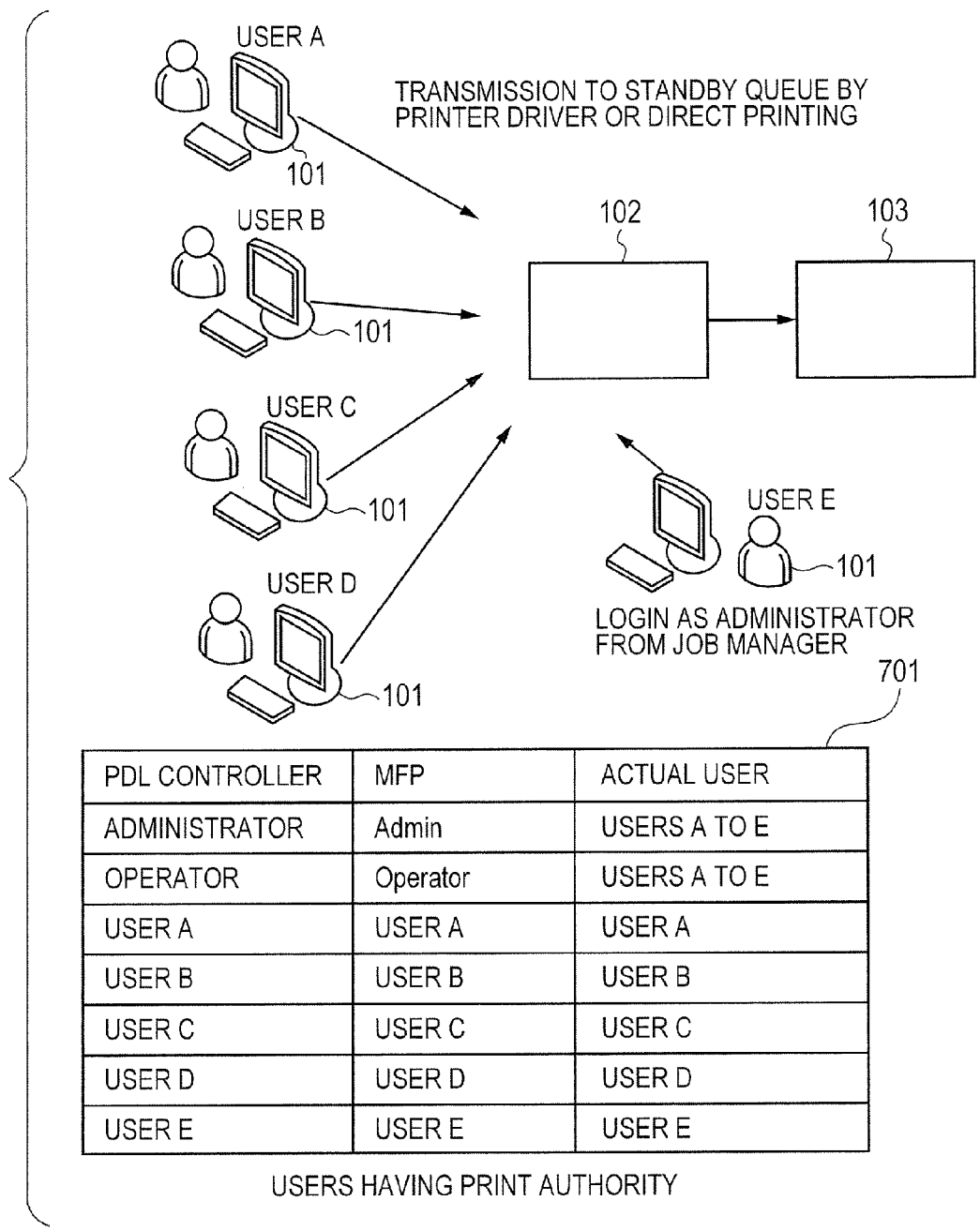
FIG. 8 is a diagram for describing user's administration.

The above problems will be described with reference to FIG. 8. In FIG. 8, five client computers 101 are connected to a printing system. The respective client computers 101 are used by a user A, a user B, a user C, a user D and a user E. In this printing environment, the user A, the user B, the user C and the user D instruct to store the print job in the standby queue through the printer driver and instruct to print the print job directly. The user E, who is an administrator of a printing apparatus composed of the PDL controller 102 and the MFP 103, performs the printing of the hold job by logging in to the PDL controller 102 from the job manager 303 on the client computer 101. A list of users having the print authority in this printing environment will be indicated in a list 701. Although there are an administrator and an operator as users of the PDL controller 102, these users actually become anyone of the users A to E. In addition, as to the administrator and the operator, it is premised that the user registration is previously performed to the MFP in order to pass the user authentication in the MFP.

In the first embodiment, when the user authentication information of the hold job is correct or the user authentication information is not yet set, only in case of performing a login operation as a user who has the print authority from the job manager 303, the printing can be performed. However, if the user E is performing a login operation as an administrator, the user authentication is to be performed as an administrator, and it cannot be known that who did actually perform the printing. In the printing environment intending to grasp the actual result of the number of prints for each individual, it is a problem that the printing can be performed by an administrator or by performing a login operation as the administrator. This problem is the same matter also for an operator.

Figure 9:
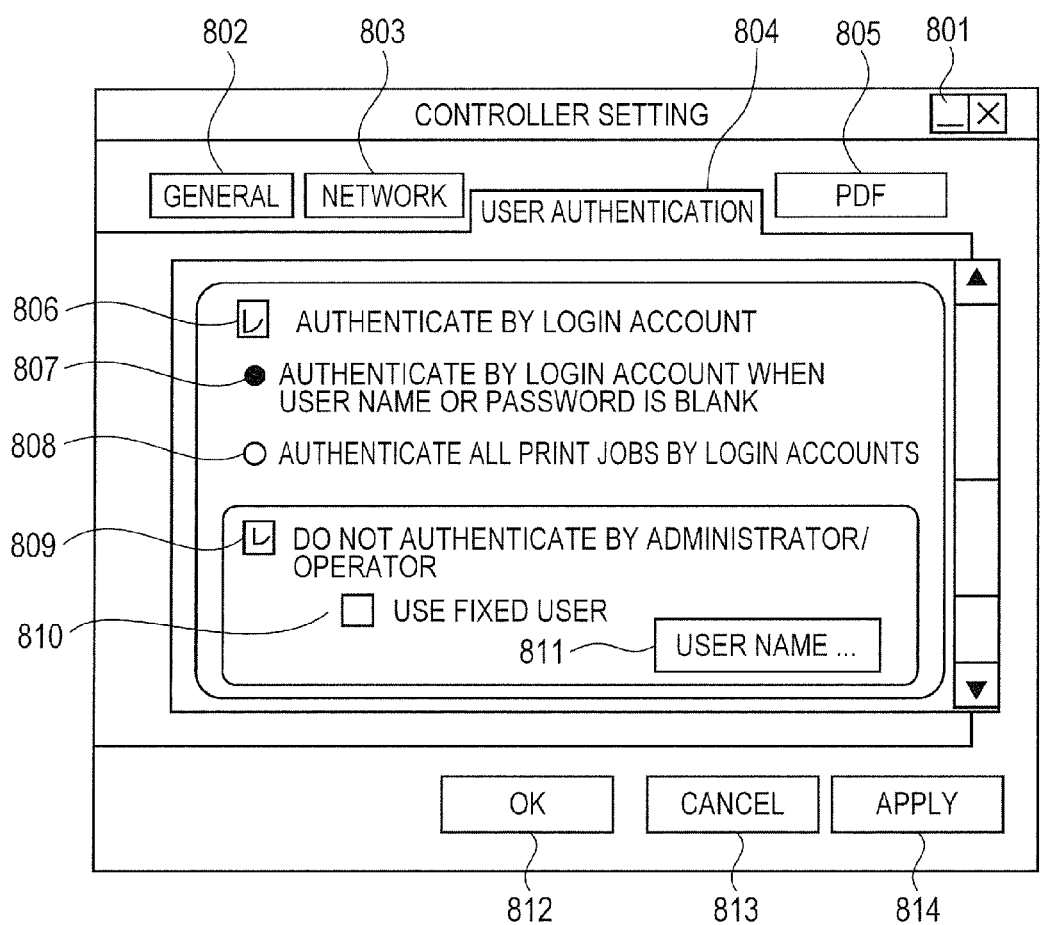
FIG. 9 is a diagram illustrating a controller setting screen.

In the second embodiment, it is enabled to set a user authentication method in accordance with the individual printing environment and an administration method of the actual result of printing. FIG. 9 is a diagram illustrating an example of a controller setting screen for performing various settings related to the PDL controller 102.

A controller setting screen 801 has plural setting screens classified into a general setting tab 802, a network setting tab 803, a user authentication setting tab 804 and a PDF (portable document format) setting tab 805. These setting screens can be called by accessing the PDL controller 102 by a browser or can be called from the job manager 303. The PDL controller 102 obtains information which was set through the setting screen and determines a processing method or the like in the user authentication. The setting of a name of the PDL controller 102, a used language and the paper size and the setting of an upper limit or the like of the print job to be stored in the PDL controller 102 can be performed at the general setting tab 802. The setting of an IP (Internet Protocol) address, a DNS (Domain Name System), security, an IPv6 (Internet Protocol version 6) and the like can be performed at the network setting tab 803. The setting related to a user authentication of the MFP 103 can be performed at the user authentication setting tab 804. The setting of the rendering, a definition of an image area, a size of a work memory and the like can be performed at the PDF setting tab 805.

The details of the user authentication setting tab 804 will be described.

A check box 806 is checked when the user authentication to the MFP 103 is performed by a login account and a password when the print job stored in the PDL controller 102 is printed. When the check box 806 is not checked, user authentication information, which is set in the stored print job, is used as the user authentication to the MFP 103.

When the check box 806 is checked, either a radio button 807 or a radio button 808 can be selected. The radio button 807 is selected when a state incapable of performing the printing is made to be released by authenticating only a print job, which cannot be obviously printed if it is remained as it is, by a login account. Since priority is given to the user authentication information which was set in the print job, when the authentication information which was set is wrong, the printing cannot be performed. The radio button 808 is selected when the user authentication is surely performed by the login account, by which the printing of the print job was actually performed.

A check box 809, which can be selected when the check box 806 is checked, is selected when it is intended not to perform the user authentication by an account which was previously prepared in the PDL controller 102. The administrator/operator is a kind of a common account and is not always associated with an individual user. When it is desired to perform a print output administration for each user, the check box 809 is checked. A check box 810 is selected when the user authentication is performed by a user account other than a login account. A screen for setting a user name appears by an operation that a user, who uses that screen, depresses a button 811. When the user selects an OK button 812, the setting is determined and the controller setting screen 801 is closed. When the user selects a cancel button 813, the setting is canceled and the controller setting screen 801 is closed. When the user selects an application button 814, the setting is determined and the controller setting screen 801 is displayed with a present condition. The user can continuously perform the setting in the controller setting screen 801.

Figure 10:
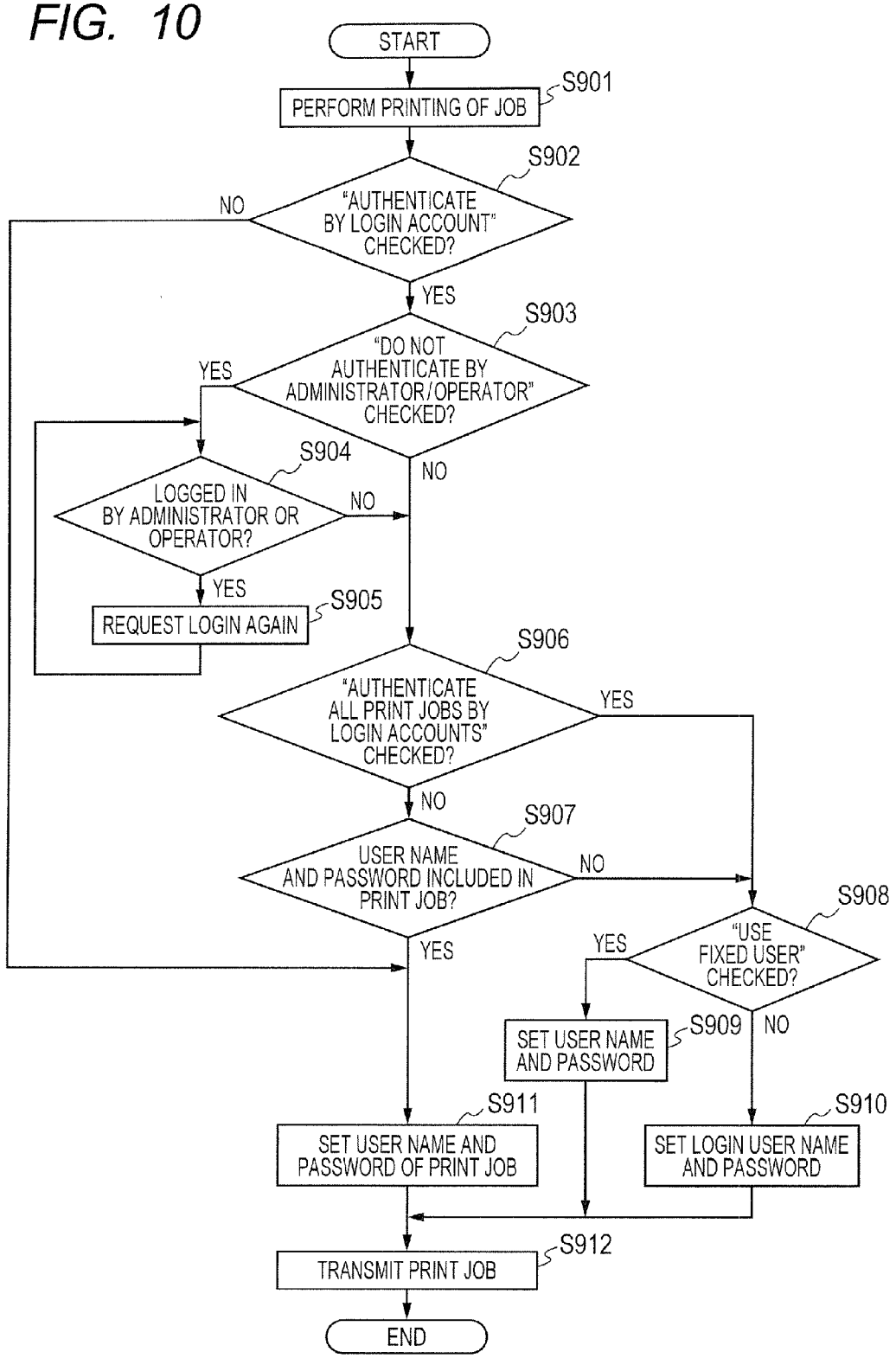
FIG. 10 is a flow chart (part 2) indicating an information process concerning the setting of authentication information.

The setting of the user authentication when transmitting the print job stored in the PDL controller 102 to the MFP 103 to which the user authentication was set will be described in accordance with the user authentication of the PDL controller 102 with reference to a flow chart in FIG. 10.

The hold job is selected on a standby queue list of the job manager 303, and when it is detected that a print button on the command toolbar 502 was depressed, the PDL job control section 305 starts a process related to the printing of the selected hold job in S901. In S902, the user administering section 311 decides whether or not a message of "AUTHENTICATE BY LOGIN ACCOUNT" at the check box 806 has been checked. When the check box 806 has been checked, the user administering section 311 advances the process to S903, and when the check box 806 has not been checked, the user administering section 311 advances the process to S911. Here, user authentication setting information which was set (or determined) in accordance with a selecting operation performed through the controller setting screen 801 is stored in the memory 202, the HDD 203 or the like of the PDL controller 102. The user administering section 311 or the like decides whether or not the check box or the like has been checked on the basis of this setting information. The above description is also similar in the following. This user authentication setting information is an example of policy information related to the authentication information.

In S903, the user administering section 311 decides whether or not a message of "DO NOT AUTHENTICATE BY ADMINISTRATOR/OPERATOR" at the check box 809 has been checked. When the check box 809 has been checked, the user administering section 311 advances the process to S904, and when the check box 809 has not been checked, the user administering section 311 advances the process to S906.

In S904, the user administering section 311 decides whether or not a user, who is performing a login operation, is an administrator or an operator. When a login user is performing a login operation as an administrator or an operator, the user administering section 311 advances a process to S905, and when the login user is performing a login operation by an account other than the above-described positions, the user administering section 311 advances the process to S906.

In S905, the PDL job control section 305 issues the displaying of "PERFORM LOGIN BY ACCOUNT OTHER THAN ADMINISTRATOR AND OPERATOR" to the job manager 303 and makes to display a login screen which is to the PDL controller 102.

In S906, the PDL job control section 305 decides whether or not a message of "AUTHENTICATE ALL PRINT JOBS BY LOGIN ACCOUNTS" at the radio button 808 has been selected. When the radio button 808 has been selected, the PDL job control section 305 advances the process to S908, and when the message of "AUTHENTICATE BY LOGIN ACCOUNT WHEN USER NAME OR PASSWORD IS BLANK" at the radio button 807 has been selected, the PDL job control section 305 advances the process to S907.

In S907, the PDL job control section 305 decides whether or not the user authentication information (user name and password) is included in the print job. When the user authentication information is included in the print job, the PDL job control section 305 advances the process to S911, and when the user authentication information is not included in the print job, the PDL job control section 305 advances the process to S908.

In S908, the PDL job control section 305 decides whether or not a message of "USE FIXED USER" at the check box 810 has been checked. When the check box 810 has been checked, the PDL job control section 305 advances the process to S909, and when the check box 810 has not been checked, the PDL job control section 305 advances the process to S910.

In S909, the PDL job control section 305 sets a user name and a password, which were set by the user name selection of the button 811, to the user authentication information of the print job and advances the process to S912.

In S910, the PDL job control section 305 sets a login user name and a password to the user authentication information of the print job and advances the process to S912.

In S911, the PDL job control section 305 sets a user name and a password of the print job to the user authentication information.

In S912, the PDL job control section 305 transmits a print job which includes image data and print attribute information to the user authentication section 307.

THIRD EMBODIMENT

<Obtaining of Attribute Information of MFP>

Figure 11:
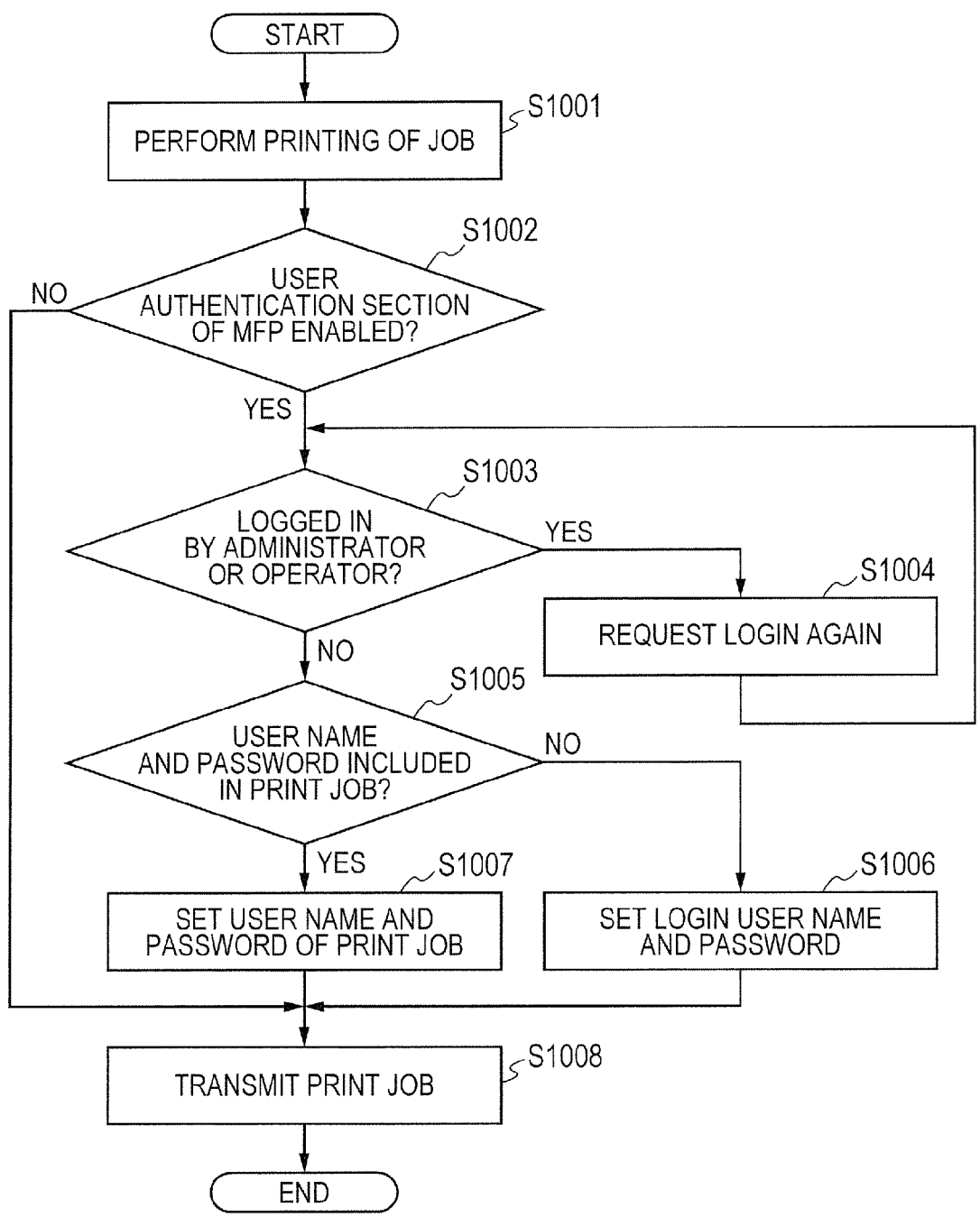
FIG. 11 is a flow chart (part 3) indicating an information process concerning the setting of authentication information.

In the first and second embodiments, it has been described subject to a fact that the user authentication section of the MFP 103 is enabled. However, the PDL controller 102 may obtain following information through the local area network cable 111, in which a control signal for the PDL printing flows, at the time of activating the MFP 103 similar to paper tray information and tonner information. That is, the PDL controller 102 may obtain attribute information indicating whether or not the user authentication section is included in the MFP 103. Then, the PDL controller 102 decides whether or not the user authentication section of the MFP 103 is enabled on the basis of the above attribute information, and when the user authentication section is enabled, a process as indicated in the above-described embodiment may be performed. A flow chart of the process in this case will be indicated in FIG. 11.

When the hold job is selected on a standby queue list of the job manager 303 and a print button on the command toolbar 502 is depressed, the PDL job control section 305 starts the printing of the hold job in S1001.

In S1002, the PDL job control section 305 decides whether or not the user authentication section is enabled to the MFP 103 on the basis of the above-obtained attribute information of the MFP 103. When the user authentication section is enabled, the PDL job control section 305 advances the process to S1003, and when the user authentication section is not enabled, the PDL job control section 305 advances the process to S1008.

In S1003, the user administering section 311 decides whether or not a user who logs in to the job manager 303 is an administrator or an operator. When the user is performing a login operation as the administrator or the operator, the user administering section 311 advances the process to S1004, and otherwise, the user administering section 311 advances the process to S1005.

In S1004, the PDL job control section 305 issues the displaying of "PERFORM LOGIN BY ACCOUNT OTHER THAN ADMINISTRATOR AND OPERATOR" to the job manager 303 and makes to display a login screen which is to the PDL controller 102.

In S1005, the PDL job control section 305 checks print attribute information of the hold job and decides whether or not a user name and a password are set to the print job. When the user name and the password are set, the PDL job control section 305 advances the process to S1007, and when the user name and the password are not set, the PDL job control section 305 advances the process to S1006.

In S1006, the PDL job control section 305 sets a user name and a password of the logged-in user to print attribute information of image data to be transmitted to the MFP 103.

In S1007, the PDL job control section 305 sets the user name and the password, which are set to print attribute information of the print job, to the print attribute information of the image data to be transmitted to the MFP 103.

In S1008, the PDL job control section 305 transmits a print job, which includes the image data and the print attribute information, to the user authentication section 307.

FOURTH EMBODIMENT

<Addition of Setting of User Authentication Information to Third Embodiment>

Figure 12:
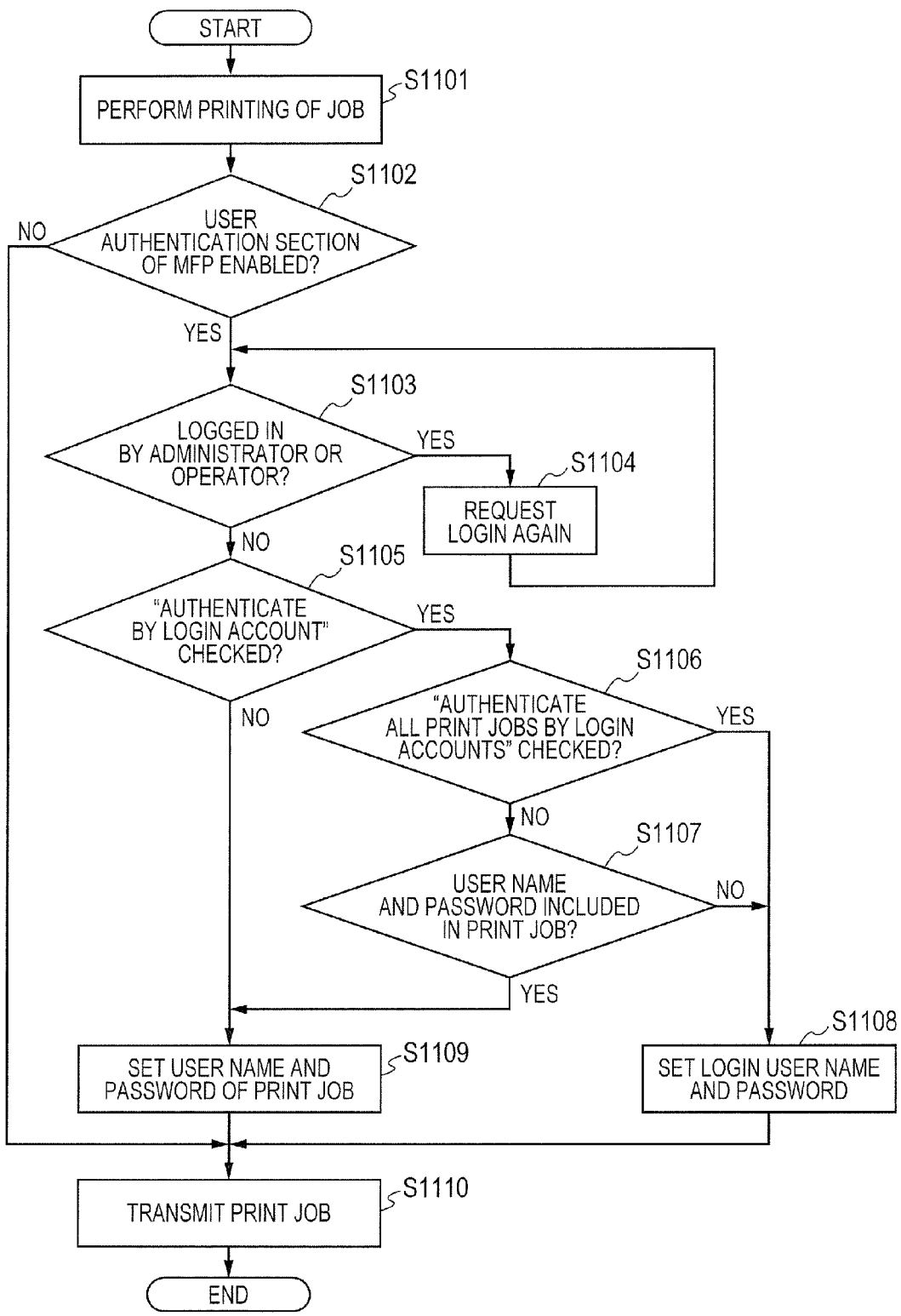
FIG. 12 is a flow chart (part 4) indicating an information process concerning the setting of authentication information.

Similar to a case of the second embodiment to the first embodiment, also as to the third embodiment, user authentication information can be set by the same reason. A process when transmitting the print job stored in the PDL controller 102 to the MFP 103 will be described in accordance with the setting of the user authentication information of the PDL controller 102 with reference to a flow chart in FIG. 12.

When the hold job is selected on the standby queue list of the job manager 303 and the print button on the command toolbar 502 is depressed, the PDL job control section 305 starts the printing of the hold job in S1101.

In S1102, the PDL job control section 305 decides whether or not the user authentication section is enabled to the MFP 103 on the basis of the attribute information of the MFP 103 obtained from the MFP 103. When the user authentication section is enabled, the PDL job control section 305 advances the process to S1103, and when the user authentication section is not enabled, the PDL job control section 305 advances the process to S1110.

In S1103, the user administering section 311 decides whether or not a user, who is performing a login operation, is an administrator or an operator. When the user is performing a login operation as the administrator or the operator, the user administering section 311 advances the process to S1104, and when the user is performing a login operation by an account other than the administrator or the operator, the user administering section 311 advances the process to S1105.

In S1104, the PDL job control section 305 issues the displaying of "PERFORM LOGIN BY ACCOUNT OTHER THAN ADMINISTRATOR AND OPERATOR" to the job manager 303 and makes to display a login screen which is to the PDL controller 102.

In S1105, the user administering section 311 decides whether or not a message of "AUTHENTICATE BY LOGIN ACCOUNT" at the check box 806 has been checked. When the check box 806 has been checked, the user administering section 311 advances the process to S1106, and when the check box 806 has not been checked, the user administering section 311 advances the process to S1109.

In S1106, the PDL job control section 305 decides whether or not a message of "AUTHENTICATE ALL PRINT JOBS BY LOGIN ACCOUNTS" of the radio button 808 has been selected. When the radio button 808 has been selected, the PDL job control section 305 advances the process to S1108, and when the message of "AUTHENTICATE BY LOGIN ACCOUNT WHEN USER NAME OR PASSWORD IS BLANK" of the radio button 807 has been selected, the PDL job control section 305 advances the process to S1107.

In S1107, the PDL job control section 305 decides whether or not the user authentication information (user name and password) is included in the print job. When the user authentication information is included in the print job, the PDL job control section 305 advances the process to S1109, and when the user authentication information is not included in the print job, the PDL job control section 305 advances the process to S1108.

In S1108, the PDL job control section 305 sets a login user name and a password to the user authentication information of the print job and advances the process to S1110.

In S1109, the PDL job control section 305 sets a user name and a password of the print job to the user authentication information and advances the process to S1110.

In S1110, the PDL job control section 305 transmits a print job, which includes image data and print attribute information, to the user authentication section 307.

As described above, according to the above-described respective embodiments, even when the authentication information used in order to perform the printing at the MFP 103 is not set to the print job, the printing can be quickly performed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-139883, filed Jul. 7, 2014, which is hereby incorporated by reference herein in its entirety.

What is claimed is:

1. A printing system which includes an image processing apparatus and a printing apparatus, wherein
   the image processing apparatus comprises:
      a processor and a memory;
      a receiving unit configured to receive a print job transmitted from an information processing apparatus;
      a generating unit configured to generate image data based on image information included in the received print job;
      a setting unit configured to set authentication information used for login to the image processing apparatus as authentication information of the print job transmitted from the information processing apparatus, and
      a transmitting unit configured to transmit the print job including the authentication information set by the setting unit and the image data generated based on the image information included in the print job transmitted from the information processing apparatus, to the printing apparatus,
      wherein the processor and the memory cooperate to function as the receiving unit, generating unit, setting unit and the transmitting unit, and
   the printing apparatus comprises:
      an authenticating unit configured to perform authentication based on the authentication information included in the print job transmitted from the image processing apparatus; and
      a printing unit configured to perform printing based on the image data according to a success of the authentication.

2. An image processing apparatus which is communicable with a printing apparatus, comprising:
a processor and a memory;
a receiving unit configured to receive a print job transmitted from an information processing apparatus;
a generating unit configured to generate image data based on image information included in the received print job;
a setting unit configured to set authentication information used for login to the image processing apparatus as authentication information of the print job transmitted from an information processing apparatus; and
a transmitting unit configured to transmit the print job including the authentication information set by the setting unit and the image data generated based on the image information included in the print job transmitted from the information processing apparatus, to the printing apparatus,
wherein the processor and the memory cooperate to function as the receiving unit, the generating unit, setting unit and the transmitting unit,
and wherein the printing apparatus performs authentication based on the authentication information included in the print job transmitted from the image processing apparatus, and performs printing based on the image data according to a success of the authentication.

3. The image processing apparatus according to claim 2, wherein, in a case where the authentication information is not set to the print job transmitted from the information processing apparatus, the setting unit sets the authentication information used for the login to the image processing apparatus as the authentication information of the print job.

4. The image processing apparatus according to claim 2, wherein
the image processing apparatus further comprises a determining unit configured to determine policy information concerning the setting of the authentication information as to whether or not to use, as the authentication information of the print job, the authentication information used for the login to the image processing apparatus, and, in a case of using the authentication information used for the login to the image processing apparatus, whether to use said authentication information when the authentication information is not set to the print job transmitted from the information processing apparatus or to use said authentication information irrespective of whether or not the authentication information has been set to the print job, and
the setting unit sets, according to the policy information, the authentication information used for the login to the image processing apparatus, as the authentication information of the print job.

5. The image processing apparatus according to claim 4, wherein the determining unit further determines, as the policy information, whether or not to perform authentication by an administrator or an operator, and, when performing the authentication by the administrator or the operator, whether or not to use authentication information of a selected user as the authentication information of the print job.

6. The image processing apparatus according to claim 4, wherein the determining unit determines the policy information based on a selection operation via a setting screen.

7. The image processing apparatus according to claim 2, wherein the image processing apparatus further comprises:
an obtaining unit configured to obtain attribute information from the printing apparatus; and
a deciding unit configured to decide whether or not an authenticating function of the printing apparatus is enabled, based on the attribute information obtained by the obtaining unit, and
on the basis of the decision by the deciding unit that the authenticating function of the printing apparatus is enabled, the setting unit sets the authentication information used for the login to the image processing apparatus, as the authentication information of the print job.

8. The image processing apparatus according to claim 2, further comprising a storing unit configured to store the print job transmitted from the information processing apparatus, wherein the setting unit sets the authentication information used for the login to the image processing apparatus, as setting information of the print job selected from among print jobs stored by the storing unit.

9. The image processing apparatus according to claim 2, wherein the image information included in the print job transmitted from the information processing apparatus is PDL data, and the image processing apparatus generates the image data based on the PDL data.

10. An information processing method in a printing system including an image processing apparatus and the printing apparatus which performs authentication based on authentication information included in the print job transmitted from the image processing apparatus, and performs printing based on the image data according to a success of the authentication, the method comprising:
in the image processing apparatus:
receiving a print job transmitted from an information processing apparatus;
generating image data based on image information included in the received print job;
setting authentication information used for login to the image processing apparatus as authentication information of the print job transmitted from the information processing apparatus; and
transmitting the print job including the authentication information set by the setting unit and the image data generated based on the image information included in the print job transmitted from the information processing apparatus, to the printing apparatus, and
in the printing apparatus:
performing authentication based on the authentication information included in the print job transmitted from the image processing apparatus; and
performing printing based on the image data according to a success of the authentication.

11. An information processing method executed by a processor of an image processing apparatus communicable with a printing apparatus, comprising:
receiving a print job transmitted from an information processing apparatus;
generating image data based on image information included in the received print job;
setting authentication information used for login to the image processing apparatus as authentication information of the print job transmitted from the information processing apparatus; and
transmitting the print job including the authentication information set by the setting unit and the image data generated based on the image information included in the print job transmitted from the information processing apparatus, to the printing apparatus,
wherein the printing apparatus performs authentication based on the authentication information included in the print job transmitted from the image processing apparatus, and performs printing based on the image data according to a success of the authentication.

12. A non-transitory computer-readable storage medium which stores therein a program to cause a computer to function as an image processing apparatus communicable with a printing apparatus, the program comprising code to execute:

a receiving step of receiving a print job transmitted from an information processing apparatus;

a generating step of generating image data based on image information included in the received print job;

a setting step of setting authentication information used for login to the image processing apparatus as authentication information of the print job transmitted from the information processing apparatus; and a transmitting step of transmitting the print job including the authentication information set by the setting unit and the image data generated based on the image information included in the print job transmitted from the information processing apparatus, to the printing apparatus, wherein the printing apparatus performs authentication based on the authentication information included in the print job transmitted from the image processing apparatus, and performs printing based on the image data according to a success of the authentication.

* * * * *